United States Patent [19]

Takeda

[11] 3,759,341

[45] Sept. 18, 1973

[54] SUPPORT APPARATUS FOR A POWER UNIT IN A MOTOR VEHICLE

[75] Inventor: Hideo Takeda, Tokyo, Japan

[73] Assignee: Honda Giken Kogyo Kabushiki Kaisha, Tokyo, Japan

[22] Filed: Oct. 22, 1971

[21] Appl. No.: 191,840

Related U.S. Application Data

[63] Continuation of Ser. No. 860,670, Sept. 24, 1969, abandoned.

[30] Foreign Application Priority Data

Sept. 24, 1968 Japan.................................. 43/68870

[52] U.S. Cl...................... 180/64 R, 180/42, 248/6
[51] Int. Cl............................................... B60k 5/12
[58] Field of Search................ 180/11, 12, 42, 64 R; 248/3, 6, 7

[56] References Cited
UNITED STATES PATENTS

| 2,751,992 | 6/1956 | Nallinger | 180/12 X |
|---|---|---|---|
| 2,208,709 | 7/1940 | Tsaarda | 180/11 X |
| 3,204,717 | 9/1965 | Collins | 180/42 |
| 1,991,619 | 2/1935 | Mackenzie | 180/11 X |
| 3,037,574 | 6/1962 | Clerk | 180/64 R X |
| 2,020,597 | 11/1935 | Appel | 180/64 R |
| 2,076,034 | 4/1937 | Lampman | 248/7 |
| 1,686,578 | 10/1928 | Slack | 180/64 |
| 2,092,040 | 9/1937 | Aitken | 180/54 |

FOREIGN PATENTS OR APPLICATIONS 873,938   9/1939   France.................................. 180/42

Primary Examiner—Kenneth H. Betts
Assistant Examiner—John P. Silverstrim
Attorney—Waters, Roditi, Schwartz & Nissen

[57] ABSTRACT

A vehicle power unit constituted by an internal combustion engine and a transmission is supported at one end from the wall of the engine compartment of the vehicle and from the other end by a T-shaped support having a hollow longitudinal arm and transverse arms supported at their free ends from the vehicle floor in the region of side sill members. The hollow longitudinal arm can receive a speed control lever which connects to the power unit.

7 Claims, 5 Drawing Figures

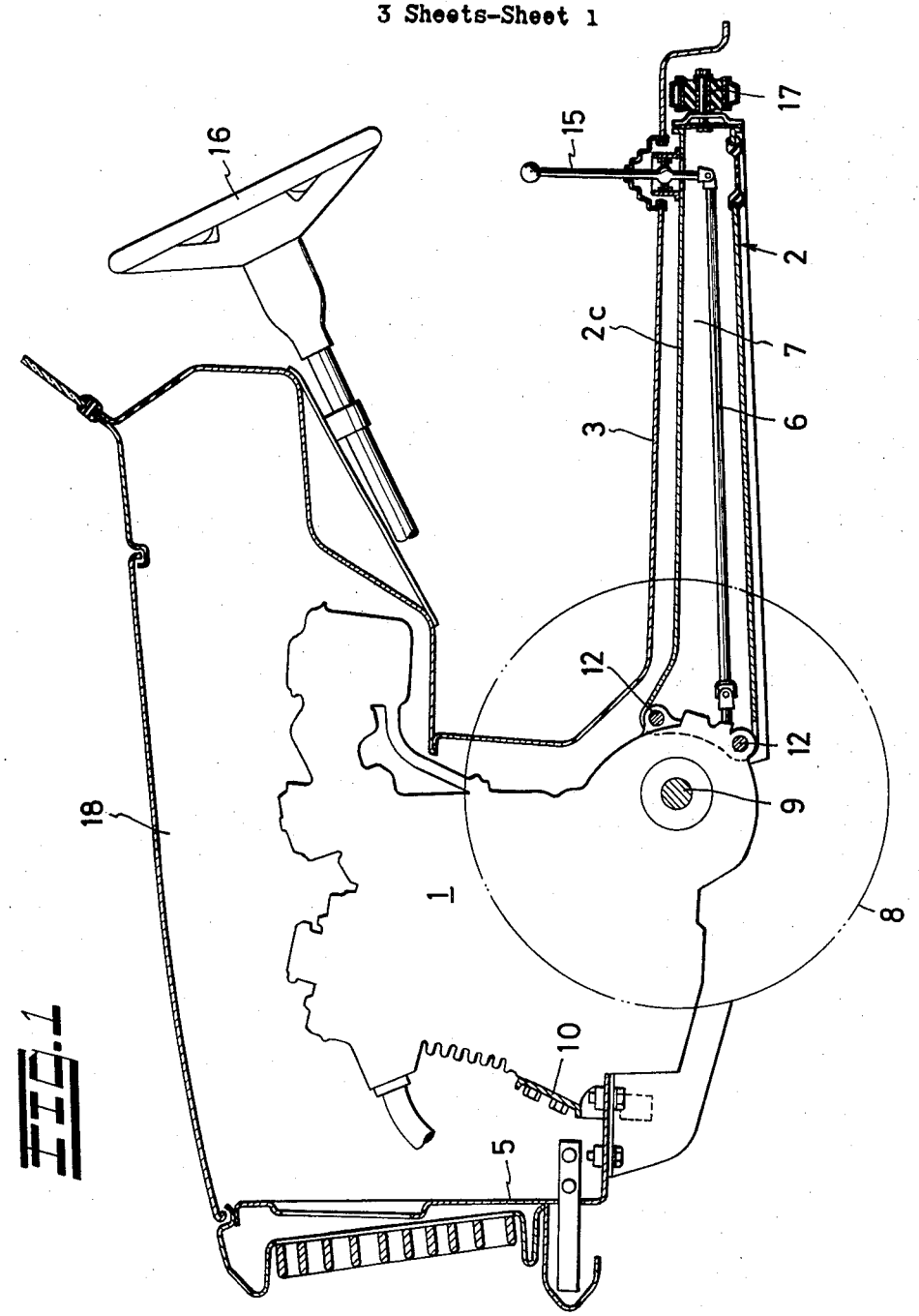

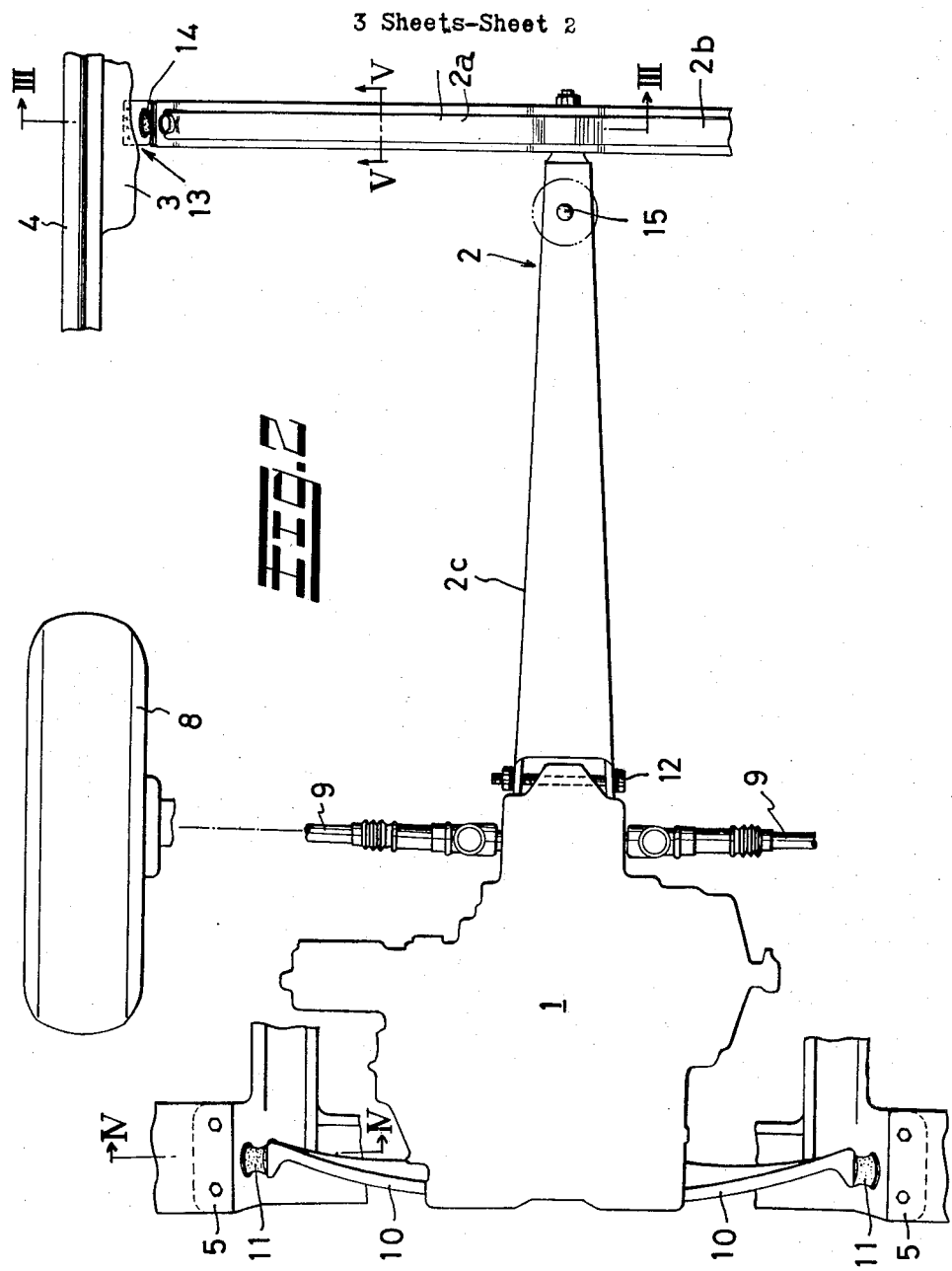

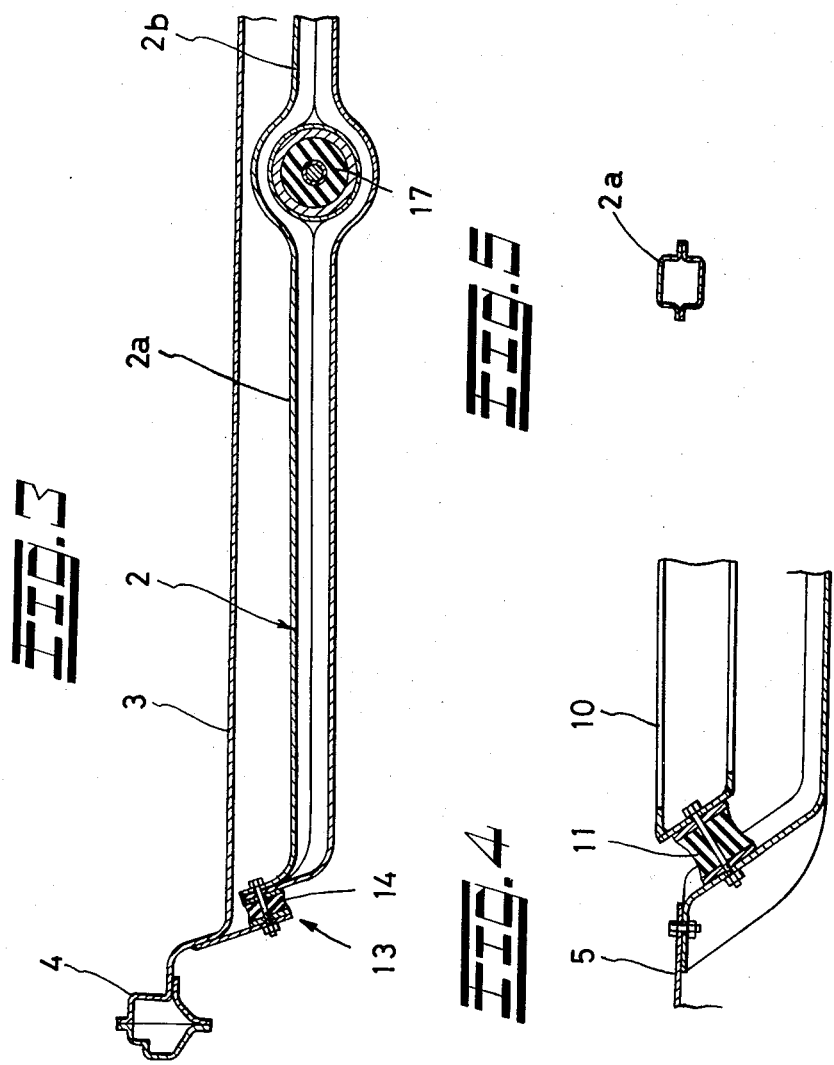

SUPPORT APPARATUS FOR A POWER UNIT IN A MOTOR VEHICLE

This application is a continuation application of Ser. No. 860,670, filed Sept. 24, 1969, now abandoned.

BRIEF SUMMARY OF THE INVENTION

This invention relates to the support of the propulsion means of a vehicle, such as a motor car.

It is conventional in a motor car of front-engine front-wheel drive type or rear-engine rear-wheel drive type to assemble an internal combustion engine, a multi-speed transmission and a differential apparatus as an integral unit to form a power unit.

Moreover, it is conventional to attach this unit at its front and rear end portions to walls of this car body for support thereby. This introduces the deficiency that the reaction torque to the wheel driving torque exerts forces on the power unit directly on its supporting joints to cause damage to said joints. Additionally vibration of the engine is transmitted directly to the walls of the car body to cause vibration thereof.

A first object of this invention is to remove these deficiencies and a second object is to provide a positive protection apparatus for a change-speed operation lever.

In accordance with the invention, the power unit is supported by means of first and second longitudinal supports coupled to the power unit at opposite ends thereof, the first support being supported from the wall of an engine compartment of the vehicle body, the second support comprising transverse arms having ends supported from the floor of the vehicle body in the vicinity of side, sill members.

The second support includes a hollow, longitudinal arm with one end connected to one of the ends of the power unit and a second end from which the transverse arms extend. The lever for the change-speed operation can extend through the hollow, longitudinal arm for connection with the power unit and a shift lever in the passenger compartment.

BRIEF DESCRIPTION OF THE DRAWING

FIG. 1 is a diagrammatic sectional side view of one embodiment of a front-wheel drive motor car according to this invention;

FIG. 2 is a plan view of the same; and

FIGS. 3, 4 and 5 are sectional views taken along the lines III—III, IV—IV and V—V in FIG. 2, respectively.

DETAILED DESCRIPTION

According to this invention, a power unit 1 composed of an integral assembly of an internal combustion engine, a transmission, and a differential mechanism is provided with a supporting member 2 comprising right and left transverse arms 2a and 2b extending transversely from the unit 1 to the lower surface of a floor 3 of the passenger compartment of the vehicle body, and the ends of arms 2a and 2b are supported from the lower surface of floor 3 in the vicinity of side sill members 4 disposed at the right and left side edges of the floor 3. Additionally the power unit 1 is supported at its front end portion from the wall 5 of an engine compartment 18.

The supporting member 2 includes a longitudinally extending arm 2c and the right and left transverse arms 2a and 2b are integral one with another and attached to arm 2c to project at right angles from the end thereof so that the member 2 assumes a T-shape as seen in FIG. 2. However, member 2 can be modified so that the right and left transverse arms 2a and 2b are arranged to extend in a V form from the power unit 1 directly or through an attaching member.

According to a feature of this invention, the longitudinally extending arm 2c is hollow and a change-speed operation lever 6 is housed in the hollow interior 7 of arm 2c and is coupled to power unit 1. Transverse arms 2a, 2b are also hollow and constructed as box beams as seen in FIG. 5.

The illustrated embodiment shows the construction where this invention is applied to a front-engine front-wheel drive type motor car, and numeral 8 denotes a front driving wheel, numeral 9 denotes its axle, and numeral 10 denotes an arm attached to the front end portion of the power unit 1, the opposite ends of said arm 10 being attached to the wall 5 of the engine compartment through respective resilient blocks 11. Numeral 12 denotes hinge pins for attachment of the supporting member 2 to the power unit 1, numeral 13 denotes the attaching portion at which the arm 2a is attached to the floor wall 3, and numeral 14 denotes a resilient block used at portion 13. Numeral 15 is a transmission shift lever, numeral 16 is a steering wheel and numeral 17 is a resilient block applied to the connecting portion interposed between the arm 2c and the transverse arms 2a and 2b.

If this invention is applied to a rear-engine rear-wheel drive type motor car, the supporting member 2 extends forward in reverse of the illustrated arrangement.

In the apparatus of this invention, the reaction torque, to the driving torque, transmitted from the wheel 8 and the axle 9 to the power unit 1 is in turn transmitted through the long supporting member 2 to the lower surface of the floor 3 remote from the axle 9, so that the resistance load is decreased in inverse proportion to the length of the supporting member 2 and thus the strength of the supporting structure can be reduced accordingly. Additionally, though the load is resisted by the floor 3, the same is partly reinforced by the side sill members 4 lying on both sides of the passenger compartment, so that it is not required for the floor 3 to be especially increased in its strength to carry the load from the arms 2a, 2b.

Additionally, the vibration of the engine is dispersed to both sides of the car body through the supporting member 2, so that the car body can be substantially freed from vibration by the engine.

If the change-speed operation lever 6 is disposed below the floor 3 and enclosed in the hollow arm 2c of the supporting member 2, said rod 6 can be prevented from being damaged by scattering pebbles and protrusions of the ground.

What is claimed is:

1. In a motor vehicle of the front engine-front drive or rear engine-rear drive type having a body including a walled engine compartment and a power unit therein supported by said body, said power unit including an integral engine-drive assembly of an internal combustion engine and a transmission, said power unit including a wheel axle extending therefrom laterally of said body for imparting rotation to at least one wheel positioned externally of said body, an improvement comprising; means for supporting said power unit from said body, said means including first and second longitudinally spaced supports coupled to said power unit at opposite ends thereof, said body having a floor with longitudinally extending sill members at the edges thereof, said first support being supported from at least one wall of and within said engine compartment, said second support including a supporting arm member extending generally longitudinally along the vehicle body below the floor thereof, and said second support further comprising transverse arms connected to said longitudinally extending arm member in proximity to one end of and below said car body and having ends supported from the body floor in the vicinity of said sill members.

2. An improvement as claimed in claim 1, wherein said longitudinally extending arm member has one end connected to one of said ends of the power unit and a second end from which said transverse arms extend.

3. An improvement as claimed in claim 2, wherein said longitudinal arm is hollow, said vehicle including a lever for a change-speed operation, said lever extending through said longitudinal arm and being coupled to said power unit.

4. An improvement as claimed in claim 2 comprising a resilient block between said longitudinal and transverse arms.

5. An improvement as claimed in claim 2, wherein said transverse arms extend from said longitudinal arm to form a T-shaped assembly therewith.

6. An improvement as claimed in claim 1, wherein said first support includes transverse arms extending from said power unit to said engine compartment wall.

7. An improvement as claimed in claim 1, said second support being proximate said axle.

* * * * *